United States Patent [19]
Katchka

[11] 3,861,586
[45] Jan. 21, 1975

[54] THERMOSTATIC FLOW CONTROL DEVICE

[75] Inventor: Jay R. Katchka, Cypress, Calif.

[73] Assignee: Robertshaw Controls Company, Richmond, Va.

[22] Filed: Aug. 15, 1973

[21] Appl. No.: 388,692

[52] U.S. Cl............. 236/1 H, 236/15 A, 236/68 D, 431/54
[51] Int. Cl............................................. F23q 9/08
[58] Field of Search ......... 236/15 A, 68 D, 99, 1 H; 431/54

[56] References Cited
UNITED STATES PATENTS

| | | | |
|---|---|---|---|
| 2,387,164 | 10/1945 | McCarty | 236/1 H |
| 2,874,904 | 2/1959 | Schwalbach | 236/1 H |
| 3,510,058 | 5/1970 | Genbauffe | 236/15 A X |

Primary Examiner—William F. O'Dea
Assistant Examiner—Peter D. Ferguson
Attorney, Agent, or Firm—Anthony A. O'Brien

[57] ABSTRACT

A thermostatic flow control device including a safety valve and a thermostatic valve controlling flow between an inlet and main and pilot outlets in a casing, a selector dial for moving a cam member within the casing, and a lever pivotally and slidably mounted in the casing and selectively controlled by the cam member, the safety and thermostatic valves having members engaging the lever and axially movable by pivoting and sliding movement of the lever, respectively, such that movement of the selector dial provides simultaneous pilot and on-off control of the safety and thermostatic valves.

19 Claims, 5 Drawing Figures

THERMOSTATIC FLOW CONTROL DEVICE

BACKGROUND OF THE INVENTION

1. Field of the Invention

The present invention pertains to thermostatic flow control devices and, more particularly, to such devices providing pilot and on-off control utilizing only a safety valve and a thermostatically operated valve.

2. Description of the Prior Art

Conventional thermostatic flow control devices, such as those utilized with water heaters and various other heating and cooling appliances to control the flow of fuel to a burner, normally use a manual on-off valve to select conditions for the control device as well as a safety valve and a thermostatically operated valve. The safety valve is utilized to prevent fuel flow through the control device when there is no flame at a pilot burner, and the thermostatically operated valve is normally positioned downstream of the manual on-off valve to supply fuel to the main burner under temperature demand. In control devices for water heaters, for instance, a rod and tube thermostat is normally utilized to operate the thermostatically operated valve with the thermostat extending into the tank of the water heater to sense water temperature whereas thermostatically operated valves in control devices for heating and cooling appliances, such as furnaces and air-conditioning units, are normally operable in response to space thermostats which control the supply of electricity to a valve operator, such as a heat motor.

Conventional manual on-off valves take the form of gas cocks or plugs cooperating with conical valve seats or valve discs; and, thus, such manual valves must be precisely formed and frequently require machining thereby greatly increasing production costs. The controls industry has long sought a practical means of eliminating the manual on-off valve; and, to this end, the embodiment of FIG. 2 of U.S. Pat. No. 3,343,557 to Dunn is exemplary of prior art control devices not utilizing a manual on-off valve. It should be noted, however, that such prior art control devices have sacrificed complete on-off control for reduction in production costs; and, thus, in order to regain the sacrificed complete on-off control, a plug valve is incorporated in the embodiment of FIG. 6 of U.S. Pat. No. 3,343,557 thereby reverting to the structure of conventional thermostatic flow control devices and their concomitant expensive production. U.S. Pat. No. 2,387,164 to McCarty is examplary of another prior art control device eliminating the manual on-off valve; however, this control device has the disadvantage of requiring complex mechanical linkages and thereby failing to reduce production costs to the extent desired.

U.S. Pat. No. 3,685,730 to Katchka discloses a thermostatic flow control device successfully eliminating the need for a manual on-off valve by providing control with a safety valve and a thermostatic valve. However, while the thermostatic flow control device of U.S. Pat. No. 3,685,730 has been found to effectively provide complete pilot and on-off control, the structure of the thermostatic flow control device requires precise mounting of a pair of operator levers within the casing to be pivoted by a selector knob to control the safety valve and the thermostatic valve; and, thus, the structure of the thermostatic flow control device is not as simple and low in cost as is desired.

SUMMARY OF THE INVENTION

The present invention is generally summarized in a thermostatic flow control device including a casing having an inlet adapted to receive fuel from a source outlet adapted to supply the fuel to a burner and a flow passage disposed between the inlet and the outlet; a safety valve including a valve seat disposed in the flow passage, a valve member cooperating with the valve seat for controlling fuel flow through the flow passage and first axially movable means for controlling movement of the valve member; safety means controlling operation of the safety valve in response to the existence of a flame at the burner; a thermostatic valve including a valve seat disposed in the flow passage a valve member cooperating with the valve seat for controlling flow through the flow passage and second axially movable means for controlling movement of the valve member; a thermostat controlling operation of the thermostatic valve in response to temperature variations; and selector means for simultaneously controlling the safety valve and the thermostatic valve including a lever engaging the first and second axially movable means to control axial movement thereof.

Accordingly, it is a primary object of the present invention to overcome the above-mentioned disadvantages of the prior art by providing a thermostatic flow control device requiring only a thermostatic valve and a safety valve to provide complete pilot and on-off control while utilizing simple control structure.

Another object of the present invention is to simultaneously control thermostatic and safety valves having parallel axes of operation by means of a single lever pivoted in response to rotation of a cam member.

A further object of the present invention is to utilize a lever within the casing of a thermostatic flow control device to control axial movement of members operating a safety valve and a thermostatic valve, a lever being pivotally mounted on an axially movable member of the thermostatic valve and having an end controlling an axially movable member of the safety valve such that the thermostatic and safety can be simultaneously controlled by rotation of a selector dial to control pivotal and sliding movement of the lever.

The present invention has an additional object in that a lever is pivotally and slidably mounted in a casing to control safety and thermostatic valves simultaneously to provide complete pilot and on-off control for a thermostatic flow control device.

Some of the advantages of the present invention over the prior art are that the need for a manual on-off valve is eliminated, complete pilot and on-off control is provided by a single cam member and a single lever controlling axially movable valve operating members, and material and assembly costs of the thermostatic flow control device are reduced.

Other objects and advantages of the present invention will become apparent from the following description of the preferred embodiment taken in conjunction with the accompanying drawings.

DESCRIPTION OF THE PREFERRED EMBODIMENT

Figure 1:
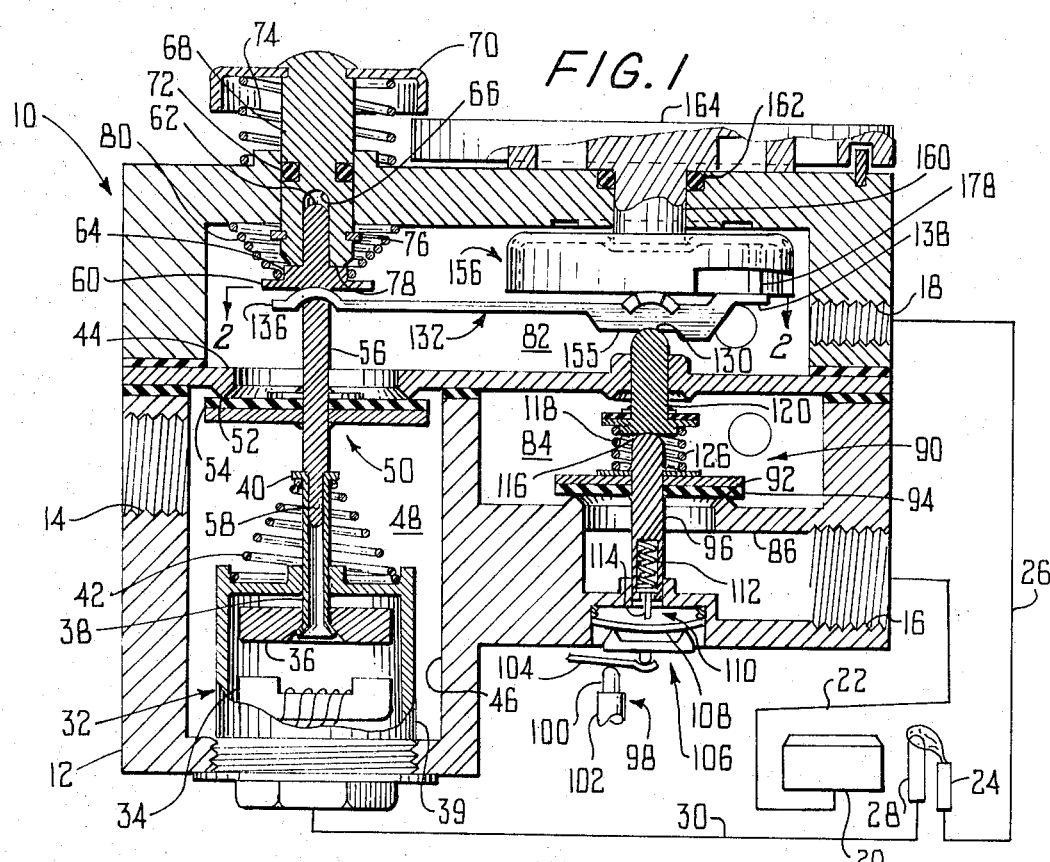
FIG. 1 is a front elevation partly in section of a thermostatic flow control device according to the present invention in an off condition.
Figure 4:
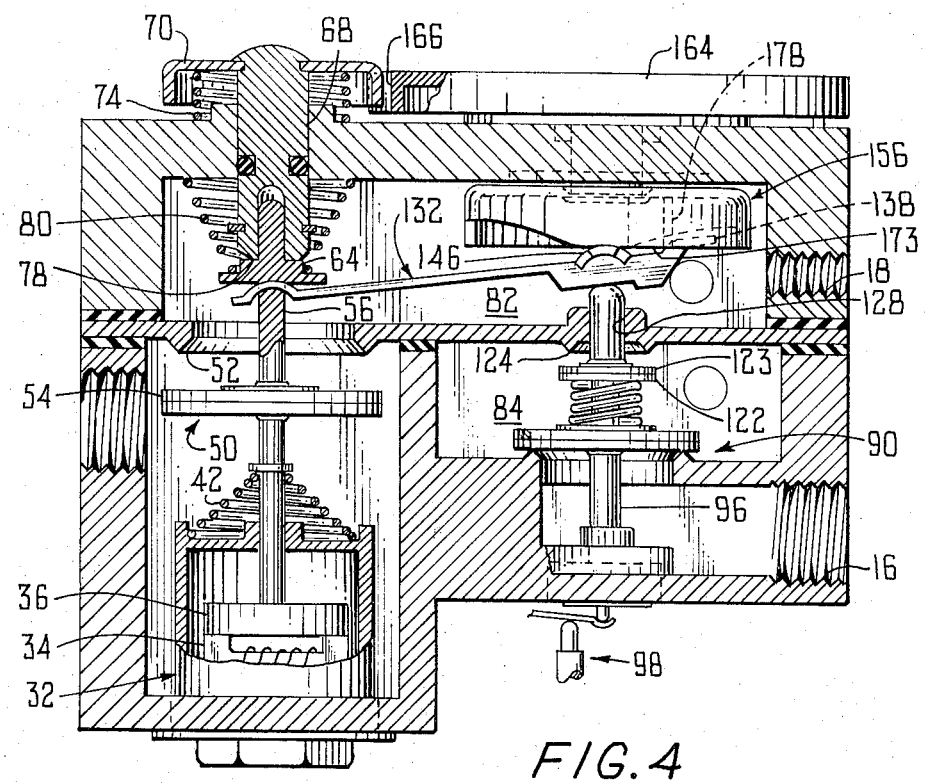
FIG. 4 is a front elevation partly in section of the thermostatic flow control device of FIG. 1 in a pilot condition.
Figure 5:
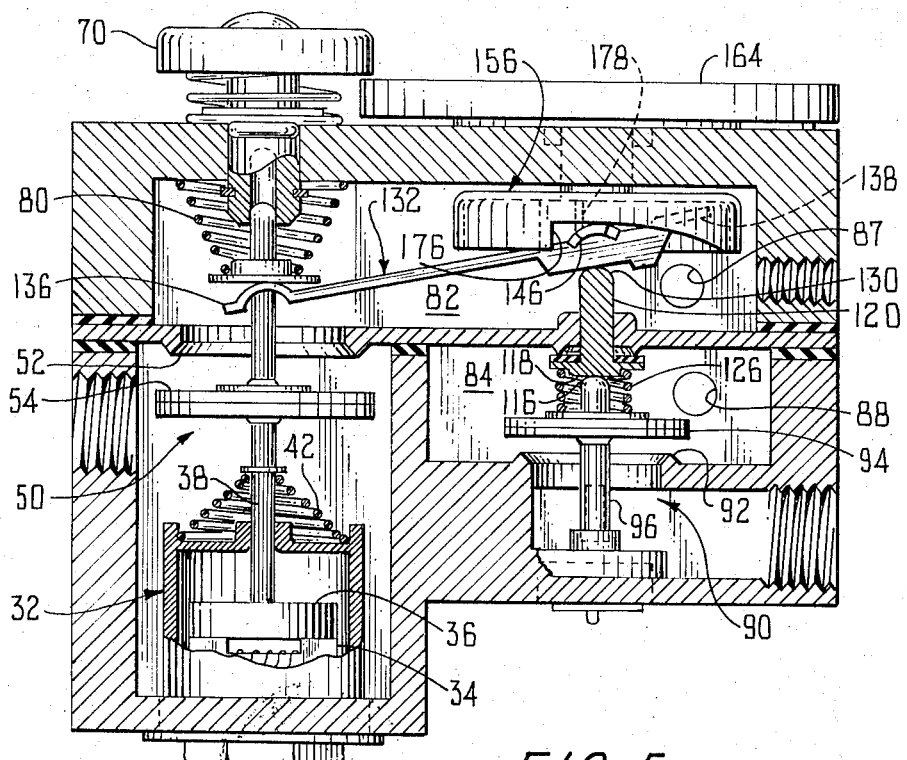
FIG. 5 is a front elevation partly in section of the thermostatic flow control device of FIG. 1 in an on condition.

A thermostatic flow control device 10 according to the present invention, as illustrated in off, pilot and on conditions in FIGS. 1, 4 and 5, respectively, includes a casing 12 having an inlet 14 adapted to receive fuel from a source, such as a gas supply (not shown), a main outlet 16 and a pilot outlet 18 with a flow passage through the casing 12 to permit the selective supply of fuel from the inlet 14 to the main outlet and the pilot outlet. Main outlet 16 communicates with a main burner 20 through a conduit 22, and pilot outlet 18 communicates with a pilot burner 24 through a conduit 26. A flame sensor in the form of a thermocouple 28 is disposed in flame sensing proximity to pilot burner 24 and is electrically connected by means of a cable 30 to an electromagnetic safety device 32 mounted in casing 12.

The electromagnetic safety device 32 includes an electromagnet 34 and an armature 36 carried on a tubular stem 38 slidably extending through an opening of a top wall of a housing 39 for the electromagnetic safety device 32. The stem 38 has a lip 40 formed at an end thereof, and a coiled spring 42 is mounted in compression between the top wall of the housing 39 and the lip 40 to bias the stem 38 and the armature 36 away from the electromagnet 34.

Casing 12 has a wall 44 therein cooperating with a wall 46 to define an inlet chamber 48 in which electromagnetic safety device 32 is disposed, and a safety valve 50 includes an annular valve seat 52 formed on wall 44 and an annular resilient valve member 54 carried between back-up plates extending transversely from the longitudinal axis of an axially movable operator 56 having a reduced diameter protrusion 58 slidably received within stem 32 at lip 40. Operator 56 has an annular flange 60 extending therefrom and an end 62 extending from an annular shoulder 64 above flange 60, the end 62 being slidably received in a hollow 66 of the stem 68 of a reset button 70. The reset button 70 is axially slidable in the top wall of the casing 12 with a gas-tight seal provided by an O-ring 72, and a coiled spring 74 is mounted in compression between the reset button 70 and the top wall of the casing 12. An annular stop 76 is carried by the stem 68 to limit upward movement thereof, and the stem has an end 78 receiving the end 62 of the operator 56 and adapted to abut the shoulder 64, a valve opening and cam follower coiled spring 80 being mounted in compression between the top wall of casing 12 and the flange 60.

Wall 44 defines, with the top wall of casing 12, a chamber 82 which communicates with a chamber 84, defined by wall 44 and a wall 86 extending transversely from wall 48, through port 87 and 88 and a pressure regulator (not shown) to provide a flow passage from inlet 14 through valve seat 52 and chamber 82 to pilot outlet 18 and from chamber 82 through the pressure regulator and chamber 84 to a thermostatic valve 90.

Thermostatic valve 90 includes an annular valve seat 92 formed on wall 86 and a resilient annular valve member 94 carried by a back-up disc extending transversely from a valve stem 96 which is axially movable in response to operation of a conventional rod and tube thermostat 98 in which a rod 100, having a relatively low coefficient of thermolinear expansion, is concentrically disposed in a tube 102, having a relatively high coefficient of thermolinear expansion, with the ends of the rod and tube joined, such as by welding. Thermostat 98 is suitably mounted to extend into a medium to be controlled and to have the free end of rod 100 engage a lever 104 which operates a clicker mechanism 106 by means of a round plate having an annular fulcrum engaging a clicker disc 108. Clicker disc 108 is adapted to snap overcenter in response to linear movement of rod 100 such that thermostatic valve 90 is operated with snap-action in response to the thermostat 98. The valve stem 96 is hollow and carries an override mechanism 110 including a coiled spring 112 mounted in compression between the bottom of the hollow portion of the stem 96 and a piston-like member 114 having a rod extending from the end of stem 96 and adapted to be engaged by clicker disc 108. Valve stem 96 has an end 116 abutting an end 118 of an axially movable plunger 120 carrying a transversely extending flange 122 with a resilient washer 123 thereon adapted to seat on an annular rib 124 extending from wall 44 to seal chamber 82 from chamber 84 when the thermostatic flow control device 10 is in the on condition. A coiled spring 126 is mounted in compression between the back-up disc carried by stem 96 and flange 122 to bias plunger 120 upward away from stem 96. The wall 44 has a bore 128 therein to slidably receive plunger 120, and the axes of plunger 120 and stem 96 are aligned, with the common axis thereof in parallel alignment with the axis of operator 56 of the safety valve 50. The plunger 120 has a rounded fulcrum end 130 abutting a lever 132.

Figure 2:
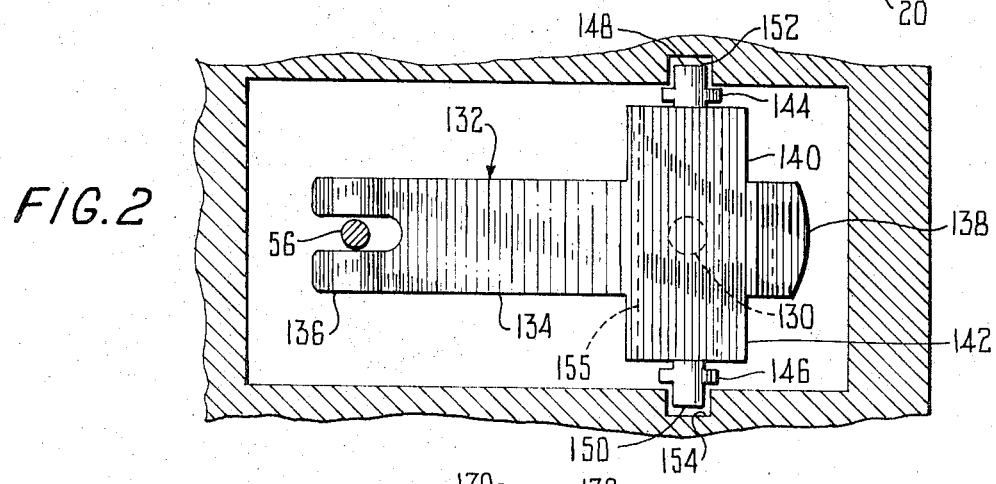
FIG. 2 is a section taken along line 2—2 of FIG. 1 showing the lever.

The lever 132, as best illustrated in FIG. 2, has a generally T-shaped configuration with an elongate leg 134 terminating at a bifurcated end 136 having arms extending on opposite sides of operator 56 for abutting flange 60 carried thereby. Leg 134 terminates at the opposite end at an offset lip 138 forming a cam follower, and a pair of opposed arms 140 and 142 extend from opposite sides of leg 134, the arms 140 and 142 carrying curved cam follower extensions 144 and 146 with ends 148 and 150 forming lever guide followers received in grooves 152 and 154 in the side walls of the casing 12, respectively. Thus, lever 134 is slidably mounted in casing 12 to be raised and lowered while maintaining its position over plunger 120. Lever 134 has a thickened fulcrum portion 155 pivotally mounted on fulcrum end 130 of plunger 120 and aligned with opposed arms 140 and 142. The cam follower lip 138 and the cam follower extensions 144 and 146 have aligned upper surfaces to contact cam surfaces of a rotatable cam member 156.

Figure 3:
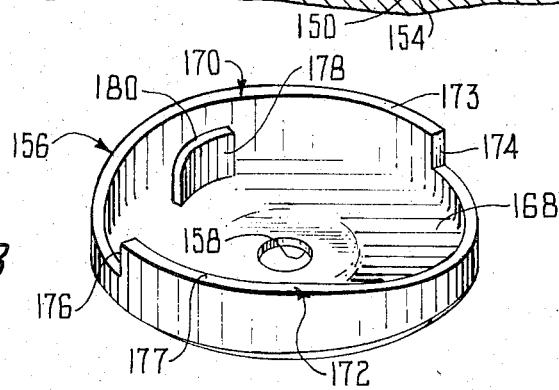
FIG. 3 is a perspective view of the cam member of the thermostatic flow control device of FIG. 1.

The cam member 156, as best illustrated in FIG. 3, has a drum-like configuration with a central aperture 158 therein by which the cam member is keyed to assure a constant relationship with a shaft 160 extending through the top wall of the casing 12 with a gastight seal provided by an O-ring 162, the external end of shaft 160 being fixed to a selector dial 164 having a notch 166 in a peripheral edge thereof. The cam member 156 has a top wall 168 with a depending peripheral wall forming a pair of opposed cam surfaces 170 and 172, the cam surface 170 having a flat portion 173 extending from a notch 174 and a portion sloping downward from flat portion 173 to a notch 176 and the cam surface 172 having a flat portion 177 extending from notch 176 and a portion sloping downward from flat portion 177 to the notch 174. An arcuate wall 178 depends from top wall 168 radially spaced inwardly from the peripheral wall, and the sloping edge of arcuate wall 178 forms an inner cam surface 180. The cam member 156 is positioned in the casing 12 such that the outer cam surfaces 170 and 172 engage the cam follower extensions 144 and 146, respectively, of the lever 132; and, the inner cam surface 180 engages the cam follower lip 138 which extends radially beyond the center of the cam member a distance less than the radial spacing of the peripheral wall of the cam member.

The operation of the thermostatic flow control device 10 will be described with reference to FIGS. 1, 4 and 5 which illustrate the thermostatic flow control device in the off, pilot and on conditions, respectively. In the off condition, as illustrated in FIG. 1, the selector dial 164 is rotated such that "off" indicia thereon is aligned with an index mark on the top wall of the casing; and, with the selecttor dial 164 and the cam member 156 in the off position, the cam follower extensions 144 and 146 ride on the flat portions 173 and 177 of the outer cam surfaces 170 and 172 near the notches 174 and 176, respectively, and the cam surface 180 engages the cam follower lip 138 of the lever. Accordingly, lever 132 is forced downwardly by the outer cam surfaces 170 and 172 such that plunger 120 compresses spring 126 with end 118 abutting end 116 of valve stem 96 thereby forcing the valve member 94 against the valve seat 92 to close the thermostatic valve 90. The engagement of inner cam surface 180 with the cam follower lip 138 pivots the lever 132 about the fulcrum end 130 of plunger 120 such that the bifurcated end 136 forces operator 56 upward against the force of spring 80 thereby moving valve member 54 against valve seat 52 to close the safety valve 50. Thus, in the off condition, safety valve 50 is closed to prevent fuel flow to chamber 82 and pilot outlet 18; and, since no fuel is supplied to pilot burner 24, the thermocouple 28 will not generate current to lock up the armature 36 in the electromagnetic safety device 32. Accordingly, spring 42 will provide additional closing force by abuttment of lip 40 with operator 56 to bias safety valve 50 closed. Communication between chamber 84 and main outlet 16 is prevented with the thermostatic flow control device 10 in the off condition since thermostatic valve 90 is closed; and, if the thermostatic flow control device 10 is placed in the off condition while there is a heat demand sensed by the thermostat 98, the thermostatic valve 90 will still be closed due to the lost motion taken up by compression of spring 112 in the override mechanism 110. Similarly, any operation of the thermostat 98 in response to temperature change of the medium being sensed will not operate to open the thermostatic valve 90 since movement of the clicker assembly 106 will be taken up by the spring 112 within the valve stem 96. With the selector dial 164 in the off position, the peripheral edge of the selector dial extends below the peripheral edge of reset button 70 thereby, along with lever 132 and cam member 156, preventing the reset button from being depressed to open the safety valve 50.

In order to supply fuel to pilot burner 24, seleccor dial 164 is rotated to align "pilot" indicia thereon with the index mark on the top wall of the casing 12 thereby rotating cam member 156 to a pilot position, as shown in FIG. 4. With the cam member 156 in the pilot position, the cam follower extensions 144 and 146 will still engage the flat portions 173 and 177 of the cam surfaces 170 and 172 to maintain thermostat valve 90 closed in the same manner as described above with respect to the off condition; however, inner cam surface 180 will be moved away from cam follower lip 138 to permit pivotal movement of the lever 132 about the fulcrum end 130 of plunger 120. Since the spring 42 is stronger than the cam follower and valve opening spring 80, while the lever 132 is free to pivot, the safety valve 50 will remain closed due to the bias from spring 42. The rotation of the selector dial 164 to the pilot position aligns notch 166 with the reset button 70 thereby removing the mechanical interlock between the reset button and the selector dial and permitting the reset button to be axially depressed into the casing 12 against the bias of spring 74. The depression of reset button 70 causes the end 78 of the stem 68 to abut shoulder 64 and move the operator 56 against the force of magnet spring 42 to open the safety valve 50 and move the armature 36 to seat on electromagnet 34. With the reset button 70 depressed, fuel is supplied from inlet 14 to pilot outlet 18 through chamber 82 and conduit 26 to pilot burner 24, and the pilot burner can thus be lit to establish a flame thereat. Thermocouple 28 will sense the flame at the pilot burner 24 to actuate the electromagnetic safety device 32 and lock up the armature 36; and, thus, safety valve 50 will remain open due to the force from valve opening spring 80 when reset button 70 is released to be returned to its normal position by spring 74. With the thermostatic flow control device 10 in the pilot condition, the thermostatic valve 90 is positively closed to permit safe lighting of the pilot burner in that fuel cannot be supplied to the main burner during the pilot lighting operation; and, if no flame is established at the pilot burner, the spring 42 will force operator 56 up to close the safety valve 50 since spring 42 is much stronger than valve opening spring 80.

With a flame established at the pilot burner, the selector dial 164 can now be rotated to the on position, as shown in FIG. 5, to permit operation of the thermostatic valve 90 to control the flow of fuel to main burner 20. With the selector dial 164 and the cam member 156 rotated to the on position, the inner cam 180 will still be out of engagement with the cam follower lip 138; however, the cam follower extensions 144 and 146 will ride up the slopes to positions near the notches 174 and 176 such that the lever guide follower ends 148 and 150 will be moved up in grooves 152 and 154 under the force from spring 118 which will force plunger 120 up to seat resilient washer 123 against rib 124 to seal chamber 82 from chamber 84 and to move end 118 of plunger 120 away from the end 116 of valve stem 96 thereby permitting operation of thermostatic valve 90 under the control of the thermostat 98. The lever 132 is still free to pivot; and, accordingly, safety valve 50 remains open as long as a flame is sensed by thermocouple 28. If, in the on condition, the flame at pilot burner 24 is extinguished, the electromagnet 34 will drop out and the force from spring 42 will overcome the force from valve opening spring 80 to move operator 56 up and close the safety valve 50 to stop the flow of fuel to both the pilot and main burners.

With the thermostatic flow control device 10 in the on condition, the thermostatic valve 90 is opened and closed to control fuel flow to main burner 20 in accordance with heat demand conditions as sensed by thermostat 98 such that when there is a demand for heat, the clicker mechanism 106 will snap overcenter to cause the disc 108 to engage the pin of piston-like member 114; and, since there is a space between the end 118 of plunger 120 and the end 116 of valve stem 96 and spring 112 is stronger than spring 126, the valve stem 96 will be moved by the thermostat to compress spring 126 and move valve member 94 away from valve seat 92 to open the thermostatic valve 90 and supply fuel to main burner 20 through main outlet 16 and conduit 22. Once the demand for heat has been satisfied, the clicker mechanism 106 will snap back overcenter to permit spring 126 to force valve stem 96 down and seat valve member 94 against the valve seat 92 to close the thermostatic valve 90 and stop the supply of fuel to main burner 20 while fuel is continuously supplied to the pilot burner 24 from chamber 82.

From the on position, if it is desired to interrupt operation of the thermostatic flow control device 10, the selector dial 164 can be rotated back to the off position which will cause inner cam 180 to contact cam follower lip 138 of lever 132 to pivot the lever about plunger 120 and move operator 56 against the force of valve opening spring 80 to seat valve member 54 on valve seat 52 and close the safety valve 50 while the cam follower extensions 144 and 146 will ride up on the flat portions 173 and 177 of cam member 156 to force plunger 120 down such that end 118 abuts end 116 of valve stem 96 to force valve member 94 against valve seat 92 and close the thermostatic valve 90 regardless of the condition of the thermostat 98 to prevent further flow of fuel to main burner 20. Once the thermocouple 28 has cooled due to the extinguishing of flame at pilot burner 24, the electromagnet 34 will release armature 36 and permit the spring 42 to return stem 38 to the position illustrated in FIG. 1 adding the force of spring 42 to the closure force of safety valve 50.

The thermostatic flow control device 10 can be modified, if pressure regulation is not desired, by forming openings in the wall 44 above the thermostatic valve 90 to provide direct access to chamber 84 without pressure regulation; and, similarly, the thermostatic flow control device 10 can be modified for other conventional components or functions. For instance, the override mechanism can be formed of flexible levers, and the axially movable members controlling the safety valve and the thermostatic valve can have any desired configuration and orientation even though the present invention is particularly advantageous with the safety and thermostatic valves having parallel axes of operation.

Inasmuch as the present invention is subject to many variations, modifications and changes in detail, it is intended that all subject matter described above or shown in the accompanying drawings be interpreted as illustrative and not in a limiting sense.

What is claimed is:

1. A thermostatic flow control device comprising a casing having inlet means adapted to receive fuel from a source, outlet means adapted to supply the fuel to a burner, and flow passage means disposed between said inlet means and said outlet means;

safety valve means including a safety valve seat disposed in said flow passage means, a safety valve member cooperating with said safety valve seat for controlling fuel flow through said flow passage means and first axially movable means for controlling movement of said safety valve member;

safety means controlling operation of said safety valve means in response to the existence of a flame at the burner;

thermostatic valve means including a thermostatic valve seat disposed in said flow passage means, a thermostatic valve member cooperating with said thermostatic valve seat to control fuel flow through said flow passage means, and second axially movable means controlling movement of said thermostatic valve member;

thermostat means controlling operation of said thermostatic valve means in response to temperature variations; and selector means for simultaneously controlling said safety valve means and said thermostatic valve means including a lever engaging said first and second axially movable means to control axial movement thereof.

2. A thermostatic flow control device as recited in claim 1 wherein said lever is pivotally mounted on one of said first or second axially movable means.

3. A thermostatic flow control device as recited in claim 1 wherein said selector means includes cam means for selectively operating said lever.

4. A thermostatic flow control device as recited in claim 3 wherein said lever has a fulcrum portion and first and second cam follower portions and said cam means includes first and second cam surfaces for engaging said first and second cam follower portions, respectively, to control movement of said fulcrum portion and pivotal movement of said lever.

5. A thermostatic flow control device as recited in claim 4 wherein said cam means is a single cam member.

6. A thermostatic flow control device as recited in claim 5 wherein said cam member is rotatably mounted in said casing and has a drum-like configuration with a top wall and first and second spaced walls depending from said top wall to define said first and second cam surfaces, respectively.

7. A thermostatic flow control device as recited in claim 1 wherein said selector means includes a single cam member for selectively operating said lever.

8. A thermostatic flow control device as recited in claim 1 wherein said first axially movable means includes an operator carrying said safety valve member and said lever has an end slidably receiving said operator.

9. A thermostatic flow control device as recited in claim 8 wherein said safety means includes a reset button axially aligned with said operator and movable to abut said operator to move said safety valve member away from said safety valve seat.

10. A thermostatic flow control device as recited in claim 9 wherein said operator has means extending therefrom for limiting movement of said end of said lever, said safety valve means includes first spring means biasing said operator in a direction to move said safety valve member away from said safety valve seat, and said safety means includes second spring means biasing said operator in a direction to move said safety valve member toward said safety valve seat, said second spring means being stronger than said first spring means.

11. A thermostatic flow control device as recited in claim 1 wherein said second axially movable means includes a plunger axially movable to control said thermostatic valve means and having an end pivotally supporting said lever.

12. A thermostatic flow control device as recited in claim 11 wherein said lever is slidably mounted in said casing and said selector means includes a cam member engaging said lever and movable to slide said lever in said casing to axially move said plunger.

13. A thermostatic flow control device as recited in claim 12 wherein said thermostatic valve means includes a valve stem carrying said thermostatic valve member and having an end disposed to abut said plunger and means for biasing said plunger away from said valve stem and toward said lever and further comprising override means for preventing movement of said valve member in response to said thermostat means when said lever slides in said casing to axially move said plunger to abut said end of said valve stem.

14. A thermostatic flow control device as recited in claim 13 wherein said first axially movable means is disposed in parallel with said second axially movable means and includes an operator carrying said safety valve member and having stop means extending therefrom, said lever has an end slidably receiving said operator and limited in movement along said operator by said stop means, said safety valve means includes first spring means biasing said operator in a direction to move said safety valve member away from said safety valve seat, and said safety means includes second spring means biasing said operator in a direction to move said safety valve member toward said safety valve seat said second spring means being stronger than said first spring means.

15. A thermostatic flow control device comprising
a casing having inlet means adapted to receive fuel from a source, outlet means adapted to supply the fuel to a burner and flow passage means disposed between said inlet means and said outlet means;
safety valve means disposed in said casing for controlling fuel flow through said flow passage means;
safety means controlling operation of said safety valve means in response to the existence of a flame at the burner;
thermostatic valve means disposed in said casing for controlling fuel flow through said flow passage means;
thermostat means controlling operation of said thermostatic valve means in response to temperture variations; and
selector means including lever means pivotally and slidably mounted in said casing and means for selectively pivoting and sliding said lever means to simultaneously control said safety valve means and said thermostatic valve means,
said selector means also including a cam member having a first cam surface for pivoting said lever means and a second cam surface for sliding said lever means in said casing.

16. A thermostatic flow control device as recited in claim 15 wherein said cam member has an off position for pivoting said lever means to close said safety valve means and sliding said lever means in said casing to a position to close said thermostatic valve means, a pilot position for pivoting said lever means to permit said safety valve means to be opened and maintaining said lever means at said position to close said thermostatic valve means, and a on position for permitting said safety valve means to be opened and for permitting said thermostatic valve means to be opened under the control of said thermostat means.

17. A thermostatic flow control device as recited in claim 15 wherein said cam member is rotatably mounted in said casing and has a drum-like configuration with inner and outer radially spaced, arcuate walls defining said first and second cam surfaces, and said lever means includes a lever having a first end controlling said safety valve means, a second end forming a cam follower positioned to be engaged by said inner wall, a fulcrum portion disposed between said first and second ends for controlling said thermostatic valve means and pivotally mounting said lever on said thermostatic valve means, and a pair of cam follower extensions extending from opposite sides of said lever for engaging said outer wall.

18. A thermostatic flow control device comprising
a casing having inlet means adapted to receive fuel from a source, outlet means adapted to supply the fuel to a burner and flow passage means disposed between said inlet means and said outlet means;
safety valve means disposed in said casing for controlling fuel flow through said flow passage means;
safety means controlling operation of said safety valve means in response to the existence of a flame at the burner;
thermostatic valve means disposed in said casing for controlling fuel flow through said flow passage means;
thermostat means controlling operation of said thermostatic valve means in response to temperature variations; and
selector means including lever means ivotally and slidably mounted in said casing and means for selectively pivoting and sliding said lever means to simultaneously control said safety valve means and said thermostatic valve means,
said lever means being formed of a single lever.

19. A thermostatic flow control device comprising
a casing having inlet means adapted to receive fuel from a source, outlet means adapted to supply the fuel to a burner and flow passage means disposed between said inlet means and said outlet means;
safety valve means disposed in said casing for controlling fuel flow through said flow passage means;
safety means controlling operation of said safety valve means in response to the existence of a flame at the burner;
thermostatic valve means disposed in said casing for controlling fuel flow through said flow passage means;
thermostat means controlling operation of said thermostatic valve means in response to temperature variations; and
selector means including lever means pivotally and slidably mounted in said casing and means for selectively pivoting and sliding said lever means to simultaneously control said safety valve means and said thermostatic valve means,
said thermostatic valve means including an axially movable member, and said lever means being pivotally mounted on said axially movable member.

* * * * *